Patented May 3, 1938

2,116,151

UNITED STATES PATENT OFFICE 2,116,151

MANUFACTURE OF MOTOR FUELS

Vladimir Ipatieff and Ben B. Corson, Chicago, Ill., assignors to Universal Oil Products Company, Chicago, Ill., a corporation of Delaware No Drawing. Application February 29, 1936, Serial No. 66,449

1 Claim. (Cl. 196—10)

This invention relates particularly to the treatment of hydrocarbons of an unsaturated character, such as the mono-olefins.

In a more specific sense the invention is concerned with the selective treatment of ethylene, which is normally gaseous, to produce particular liquid polymers which are of superior value as antiknock blending fluids for gasolines inferior in this respect.

Oil cracking processes which are in use as a means of supplementing the supply of gasoline obtainable by straight run distillation from crudes, and also for producing higher antiknock value material than the so-called "natural" gasolines, i. e. gasolines which are produced by straight distillation of crude oils, are also productive of considerable quantities of fixed gases and heavy residual products, both liquid and solid, which are in a sense waste products of the process in that little utilization of them has been made other than as fuels. The fixed gases produced, for example, in cracking a topped crude with the primary object of producing gasoline may run as high as 10% by weight of the charging oil under intensive cracking conditions. The composition of these gases will vary with the severity of the cracking operation, the nature of the charging stock, the phase prevalent during the operation, and other factors. The following table shows a list of the hydrocarbon compounds which have been found in the fixed gases from oil cracking plants:

| | |
|---|---|
| Hydrogen | $H_2$ |
| Methane | $CH_4$ |
| Ethane | $C_2H_6$ |
| Ethylene | $C_2H_4$ |
| Propane | $C_3H_8$ |
| Propylene | $C_3H_6$ |
| Butanes (normal and iso) | $C_4H_{10}$ |
| Butenes (normal and iso) | $C_4H_8$ |

The above tabulation omits mention of minor constituents such as hydrogen sulphide, low boiling mercaptans, and more highly unsaturated hydrocarbons than the mono-olefins, such as, for example, butadienes, but it will serve to indicate the general character of some of the gas mixtures which may be treated by the present process.

The tendency of the gaseous mono-olefins to polymerize varies considerably when using different catalysts and also with the same catalyst. The present process is an adaptation of a particular type of catalyst to polymerize ethylene under selected conditions of temperature and pressure, and particularly that present in the gases from oil cracking operations.

In one specific embodiment the process is directed to the treatment of ethylene, or hydrocarbon gas mixtures containing ethylene, at temperatures of the order of 500 to 700° F. and superatmospheric pressures above 300 pounds per square inch to produce liquid hydrocarbons therefrom.

We have previously found that, by utilizing certain types of solid phosphoric catalysts whose preparation and properties will be later described in detail, the 3 and 4-carbon atom olefins present in hydrocarbon gas mixtures can be selectively and successively polymerized in order of their reactivities and have particularly determined that this separation is best effected while varying the temperatures at which the olefins are contacted with the solid catalysts over a considerable range. We have now further determined that ethylene, which is the lightest constituent of olefin-containing gas mixtures, is readily polymerized at higher temperatures and pressures than those previously disclosed, such as, for example, 600° F. and 500 pounds per square inch, and times of contact of the order of 300 seconds or higher. Successful selective polymerization may be effected by first polymerizing the four carbon unsaturated hydrocarbons at the lower range of temperatures of the order of 70 to 200° F., then subjecting the residual gases to higher temperatures of 200 to 500° F. and selectively polymerizing propylene, and finally increasing temperature and pressure conditions on the gas, and polymerizing the ethylene containing gas from the last step at temperatures of 500 to 700° F. and pressure approximately 500 pounds per square inch. If the mole fraction of the ethylene in the gas mixture is low, higher temperatures and pressures are desirable with concurrently longer contact times to produce substantial yields of ethylene polymer.

Another method of treating ethylene-containing gases for the production of liquid motor fuel polymers from the ethylene is to first treat them to separate the ethylene in pure form or make a more concentrated ethylene-containing gas mixture. Various methods may be employed for doing this, for example, residual cracked gas mixtures after the removal of propylene and butylenes by polymerization may be contacted with substantially solid, but preferably slightly moist cuprous chloride, at relatively low temperatures and increased pressures to form a loose addition compound, with the approximate formula $$CuCl.C_2H_4,$$

the ethylene being then recovered by elevating the temperature and decreasing the pressure. The cuprous chloride may be mixed with inert spacing materials to prevent agglomeration and caking.

Another method for producing either pure ethylene or concentrated gas mixtures of ethylene consists in simple fractionation of such mixtures.

This invention is not limited to the treatment of cracked hydrocarbon gases or their fractions, but may be employed to polymerize any gas mixture containing ethylene.

The catalysts and conditions of operation heretofore employed in attempting to produce considerable yields of motor fuel fractions from ethylene have tended rather to produce heavy viscous polymers of the general nature of lubricating oils. This is due in part to the difficulty commonly encountered in polymerizing ethylene as compared with its higher molecular weight homologs so that, when more severe conditions are employed in respect to time, temperature, pressure and catalysts, the polymerization proceeds past the point corresponding to the formation of low boiling hydrocarbon liquids and resembles somewhat an autocatalytic reaction, possibly due in part to the extreme exothermic character of the reactions involved in ethylene polymerization, which is strikingly in evidence when attempts are made to polymerize this compound under heat and pressure without catalyst which result frequently in serious explosions at some critical temperature. With the present type of catalyst these difficulties are substantially obviated and material yields of motor fuel fractions are producible even from the pure compound.

The catalysts which are used in the present connection are of a special and unique character and warrant detailed description, as they are evidently peculiar in their action. They are made generally by mixing an acid of phosphorus, preferably a phosphoric acid such as the ortho and/or the pyroacid, with a substantially unreactive and generally siliceous adsorbent until a paste is obtained, this paste being then calcined to produce a solid cake, which is ground and sized to produce catalyst granules. It has been found in the case of highly adsorbent materials, such as kieselguhr, that primary composites may be made in which the acid of phosphorus is the major constituent by weight. Thus, a stiff paste is produced when 80 parts of commercial orthophosphoric acid is mixed at ordinary temperatures with 20 parts of kieselguhr. Conversely, relatively dry mixes result when about 30 parts of this acid is mixed with 70 parts by weight of the adsorbent. By incorporating varying quantities of phosphoric acid with these adsorbents, catalyst masses are produced which have varying polymerizing effectiveness which may be due to the variation in the actual contact surface of the acid which is exposed during service.

By controlling the proportions of adsorbent and acid and also the temperature employed in the drying or calcining step, granular catalyst composites may be produced which vary both in the percentage of the acidic component and in the strength of said component.

Catalysts may be utilized which have been produced by merely mixing commercial ortho-phosphoric acid of approximately 90% concentration with a siliceous and finely divided adsorbent material and drying at temperatures of approximately 250° F. to 300° F., which operation, if conducted for periods of time which vary somewhat with the amount of acid present in the mix, ultimately yields solid catalysts which contain 100% ortho-phosphoric acid as their essential constituent. To produce catalysts useful for selectively polymerizing propylene and ethylene, it is preferable to employ conditions which ultimately produce an acid most closely approaching the pyroacid in composition, and in this operation the temperatures of calcining in the preparation of the catalyst will vary from approximately 500° F. to 600° F., depending again upon the exact amount of acid by weight of the mixture and the type of the adsorbent.

When a catalyst composite comprising an acid approximately the pyroacid in composition as the essential active ingredient is desired, and the orthoacid has been used in the primary mixtures, the most effective catalysts are produced when the pasty mixtures are heated at temperatures from approximately 500 to 600° F., for a considerable period of time, usually from 40 to 60 hours. During this heating, water is evolved and analysis shows that the remaining acid has a composition closely approaching that of the pyroacid. Advantages are frequently gained in utilizing the higher temperatures and also in starting with the pyroacid. When using this acid in primary mixes temperatures of from approximately 310 to 360° F. are used to insure proper fluidity. With efficient mixing devices the time required for producing uniform distribution is lowered considerably, frequently only 5 minutes being required. If dehydration is found to have taken place to too great an extent so that the polymerizing effectiveness is reduced (as shown by small scale tests) the particles may be contacted with superheated steam at temperatures within the approximate range of 500 to 600° F. to produce the catalytic acid of optimum composition.

A feature of the present invention resides in the employment of ordinarily liquid phosphoric acids as polymerizing catalysts in substantially solid form, this being accomplished by the alternative use of a number of different adsorbent carrying materials which vary somewhat in their adsorptive capacity and also in their chemical and physical properties and their influence upon the catalytic effect of the mixtures. The materials which may be employed are divisible roughly into two classes. The first class comprises materials of a predominately siliceous character and includes diatomaceous earth, kieselguhr and artificially prepared porous silicas such as, for example, "Sil-O-Cel". In the case of naturally occurring diatoms it is believed that they sometimes contain minor amounts of highly active aluminum oxide which in some instances seems to contribute to the total catalytic effect of the solid catalyst. This active material is not present in the artificially prepared forms of silica.

The second class of materials which may be employed either alone or in conjunction with the first class (and with certain other optional ingredients to be later described) comprises generally certain members of the class of aluminum silicates and includes such naturally occurring substances as the various fuller's earths and clays such as bentonite montmorillonite, etc. The class also includes certain artificially prepared aluminum silicates of which the product known as "Tonsil" is representative, this substance being in a sense a purified aluminum silicate made by treating certain selected clays with hydrochloric or other mineral acid and washing out the soluble reaction products. Both the naturally occurring and acid-treated substances in this general class are characteristized by a high adsorptive capacity which is particularly in evidence in making up the present type of phosphoric acid catalysts, and they may also contain traces of active ingredients which assist in producing the desired polymerizing effects. Again each substance which may be used alternatively will exert its own specific influence which will not necessarily be identical with that of the other members of the class.

In some cases the structure of the solid phosphoric acid catalysts may be improved by the primary incorporation of organic materials which yield a carbonaceous residue on heating. Substances which may be used in this manner include such materials as cellulose, starches, sugars, glue, gelatin, flour, molasses, agar-agar, etc. They evidently function as binders to some extent to prevent the breakdown of the catalyst structure when subjected to elevated temperatures and the action of hydrocarbon vapors or liquids in service.

The invention may employ as a preliminary treatment on ethylene-containing gas mixtures, such as cracked receiver gases or stabilizer reflux, any suitable method for the removal of hydrogen sulphide, low boiling mercaptans, dienes and other gases which may interfere with the normal functioning of the catalysts, the liquefaction of a substantial portion of the reactive olefins, or the production of polymers of sufficient purity for ready incorporation with refined gasolines. Subsequently, the liquid polymer products from the ethylene may be subjected to any of the ordinary chemical treatments commonly employed on cracked distillates, such as a limited amount of sulphuric acid, caustic soda, sweetening reagents and the addition of small amounts of inhibitors.

After some period of use which will vary with the material treated and the conditions of operation, any given catalyst mass employed according to the present invention will show a decrease in activity due to the gradual accumulation of heavy tarry materials and its regeneration will be imperative. The regeneration steps commonly comprise: (1) removal of distillable materials by the use of superheated steam at temperatures of approximately 600° to 700° F.; (2) the use of oxidizing gas mixtures of graded oxygen content to burn out the carbonaceous material at temperatures of the order of 900° F.; and (3) the rehydration of the acid by steam at temperatures of 400° to 600° F. In the burning step it is most advantageous in commercial units to employ primarily instead of air a flue gas mixture produced by using only a very slight excess of air in the combustion of the fuel, so that the total oxygen content is below 1%. If air is used at first too high temperatures are likely to develop and portions of the catalyst will be over-burned, causing the formation and a loss of the volatile meta acid, which is formed as a result of too extensive dehydration. In the burning step the temperature of 950° F. should not be exceeded.

Solid phosphoric acid catalysts are characterized by their ability to polymerize ethylene, as well as heavier olefins to produce relatively low boiling hydrocarbon polymers rather than heavy tars or pitches and by their long life due to the absence of such highly carbonaceous reaction products and also due to lack of oxidizing tendency in the phosphoric acid which constitutes a substantial portion thereof. In contrast to this it is notable that when employing sulphuric acid as a polymerizing agent, caution is necessary to prevent oxidation and undesirable side reactions such as ester formation and that, when employing metal halides such as aluminum chloride or zinc chloride, the tendency toward the formation of heavy polymers is very pronounced. Furthermore, solid phosphoric acid catalysts are readily regenerated after they have been contaminated by surface carbon deposits after long periods of service by merely burning off the deposits with air or other oxidizing gas at moderate temperatures. A still further advantage resides in the fact that they are substantially of non-corrosive character as compared with the decided corrosive action of liquid phosphoric acid and other liquid polymerizing agents. The peculiar structural strength of catalyst masses of the solid phosphoric acid type should be noted in connection with the general advantages which they possess, this being of special commercial value.

The following example is given to indicate the character of the results obtainable by the use of the present process, although not with the intention of correspondingly limiting the scope of the invention:

*Example*

Substantially pure ethylene was treated with solid phosphoric acid catalyst comprising approximately 60% by weight of pyrophosphoric acid impregnated in kieselguhr and ground to a mesh size of 38% of 4-6 and 62% of 6-10. The ethylene was first preheated to a temperature between 565 and 620° F. and then introduced into a vessel containing a bed of the solid catalytic material. Pressure on the system varied between 500 and 550 pounds per square inch.

The following table gives run data on three separate ethylene polymerization tests:

*Ethylene polymerization run data*

| Tests | 1 | 2 | 3 |
|---|---|---|---|
| Temperature, °F | 565 | 565 | 617 |
| Pressure, lbs./square inch gauge | 530 | 515 | 512 |
| Contact time, seconds | 700 | 855 | 445 |
| Gas in, unit volume at 60° F. and 760 mm | 136 | 150 | 148 |
| Gas out, unit volume at 60° F. and 760 mm | 33 | 34 | 47 |
| Gals. polymer product per 1000 cu. ft. (actual) | 8.6 | 8.6 | 7.9 |
| Gals. polymer product per 1000 cu. ft. (theoretical) | 10.9 | 10.7 | 10.8 |
| Polymerization, percent | 79 | 80 | 73 |

The following table gives distillation analyses of the crude polymer from ethylene polymerization for the three tests:

| Tests | 1 | 2 | 3 |
|---|---|---|---|
| Gravity, °A. P. I. at 60° F | 49.5 | 47.6 | 48.7 |
| Octane No. 82 | | | |
| I. B. P. °F | 88 | 100 | 108 |
| 5% | 111 | 125 | 132 |
| 10 | 126 | 141 | 145 |
| 20 | 157 | 173 | 177 |
| 30 | 199 | 218 | 212 |
| 40 | 260 | 284 | 267 |
| 50 | 347 | 357 | 336 |
| 60 | 406 | 412 | 400 |
| 70 | 459 | 464 | 453 |
| 80 | 515 | 508 | 503 |
| 90 | 577 | 577 | 577 |
| 95 | 617 | 640 | 631 |
| E. P. °F | 640 | 648 | 618 |
| % over at 400° F | 58.4 | 57.7 | 60.2 |
| % over at 410° F | 60.4 | 59.7 | 61.5 |
| % over at 437° F | 65.7 | 64.5 | 67.0 |
| % over at 572° F | | 89.7 | |
| % over | 94.0 | 96.5 | 95.5 |
| % bottoms | 3.0 | 1.5 | 3.0 |
| % loss | 3.0 | 2.0 | 1.5 |

From the above results it can readily be seen that high yields (about 75%) of high antiknock motor fuel are obtained by polymerization of ethylene in the presence of solid phosphoric acid under the conditions specified.

The character of the present invention and its commercial aspects are clearly evident from the foregoing specification and the single example given though neither is intended to be unduly limiting upon its generally broad scope.

We claim as our invention:

A process for the production of liquid polymers from ethylene, which comprises subjecting ethylene to the action of a solid catalyst comprising essentially a calcined mixture of a phosphoric acid and a siliceous material at a temperature of the order of approximately 500 to 700° F. and a superatmospheric pressure above 300 pounds per square inch and for a contact time of at least 300 seconds to polymerize and to convert the ethylene into liquid polymers, and recovering the liquid polymers.

VLADIMIR IPATIEFF.
BEN B. CORSON.